Aug. 16, 1932.  S. R. FETNER  1,872,265
INNER LINER FOR TIRE CASINGS
Filed Oct. 18, 1930  2 Sheets-Sheet 1

Inventor:
S. R. Fetner,
By
Attorney

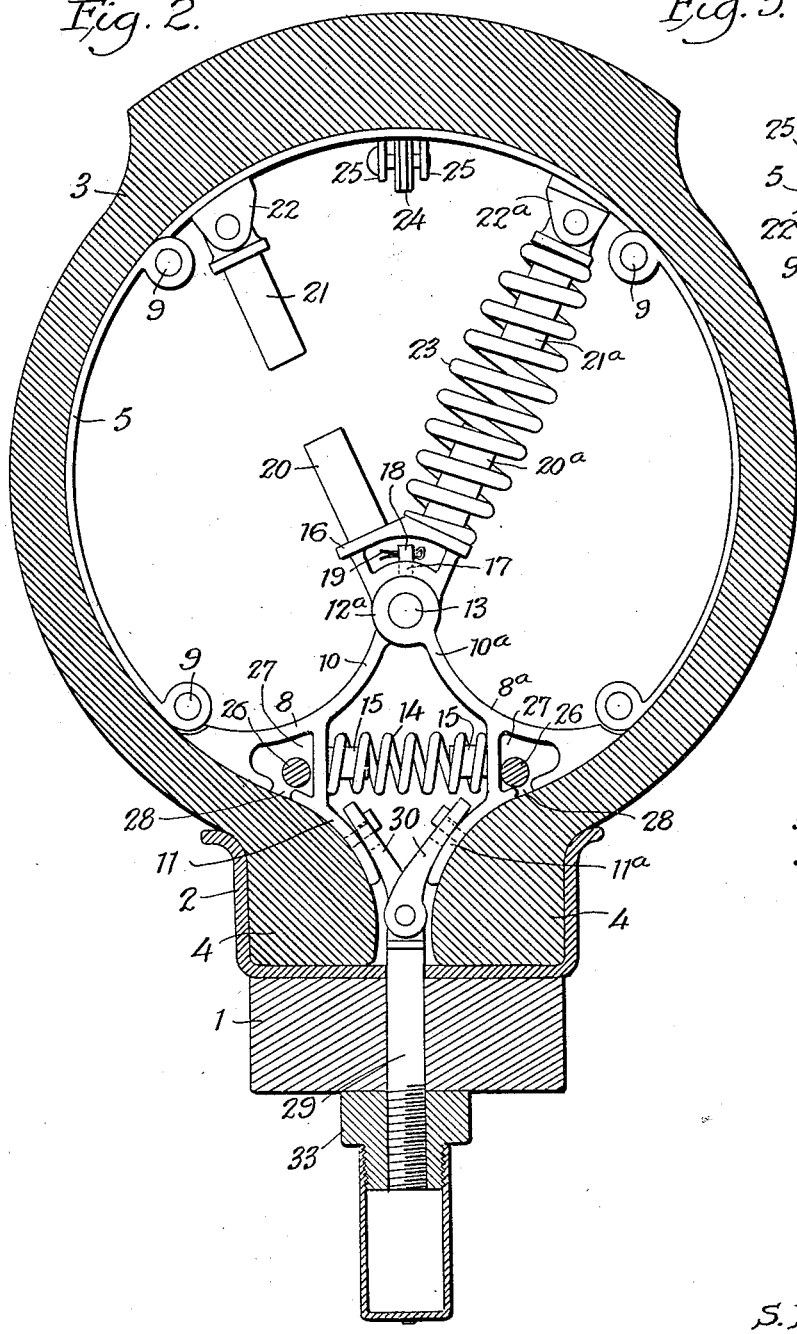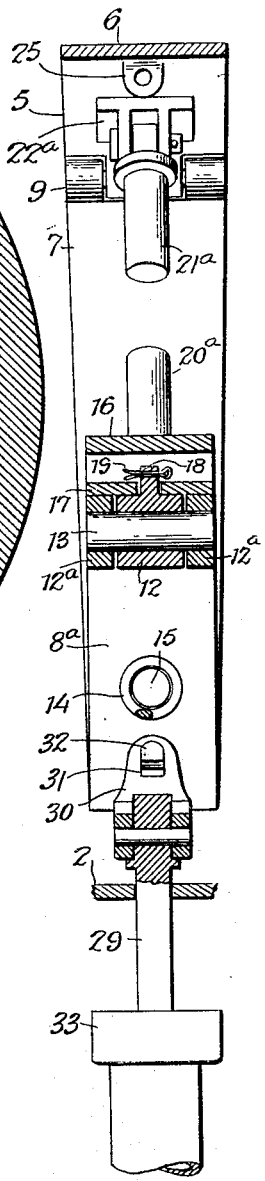

Patented Aug. 16, 1932

1,872,265

UNITED STATES PATENT OFFICE

STEPHEN R. FETNER, OF JACKSONVILLE, FLORIDA

INNER LINER FOR TIRE CASINGS

Application filed October 18, 1930. Serial No. 489,674.

This invention relates to a resilient core or inner liner or frame adapted for use in place of an air-inflated inner tube within the casing or shoe of a rubber automobile tire to keep the tire casing elastically distended and to allow cushioning or shock absorbing actions of the tire corresponding to those afforded by the use of an inflated inner tube without the disadvantages attendant upon the use of such tube.

The object of the invention is to provide a core or inner liner or frame of this character which will hold the shoe securely to the rim while resiliently backing the shoe and permitting cushioning movements thereof; which is adapted to be easily applied and removed; which will not be affected by shoe punctures and will therefore form, in effect, with the shoe a puncture proof tire; and which, while overcoming the disadvantages of an air-inflated inner tube, will outlast many successive tubes, and thereby may be indefinitely used and afford economy over the present practice of employing such tubes.
The invention consists of the features of construction, combination and arrangement of parts hereinafter more fully described and claimed, reference being had to the accompanying drawings, in which:
Figure 1 is a side elevation showing an automobile wheel equipped with a tire embodying my invention.

Figure 2 is a cross section through the wheel and tire.
Figure 3 is a central section taken circumferentially of the wheel through one of the core, liner or frame units and showing a rim bolt or stem associated therewith.

Figure 1:
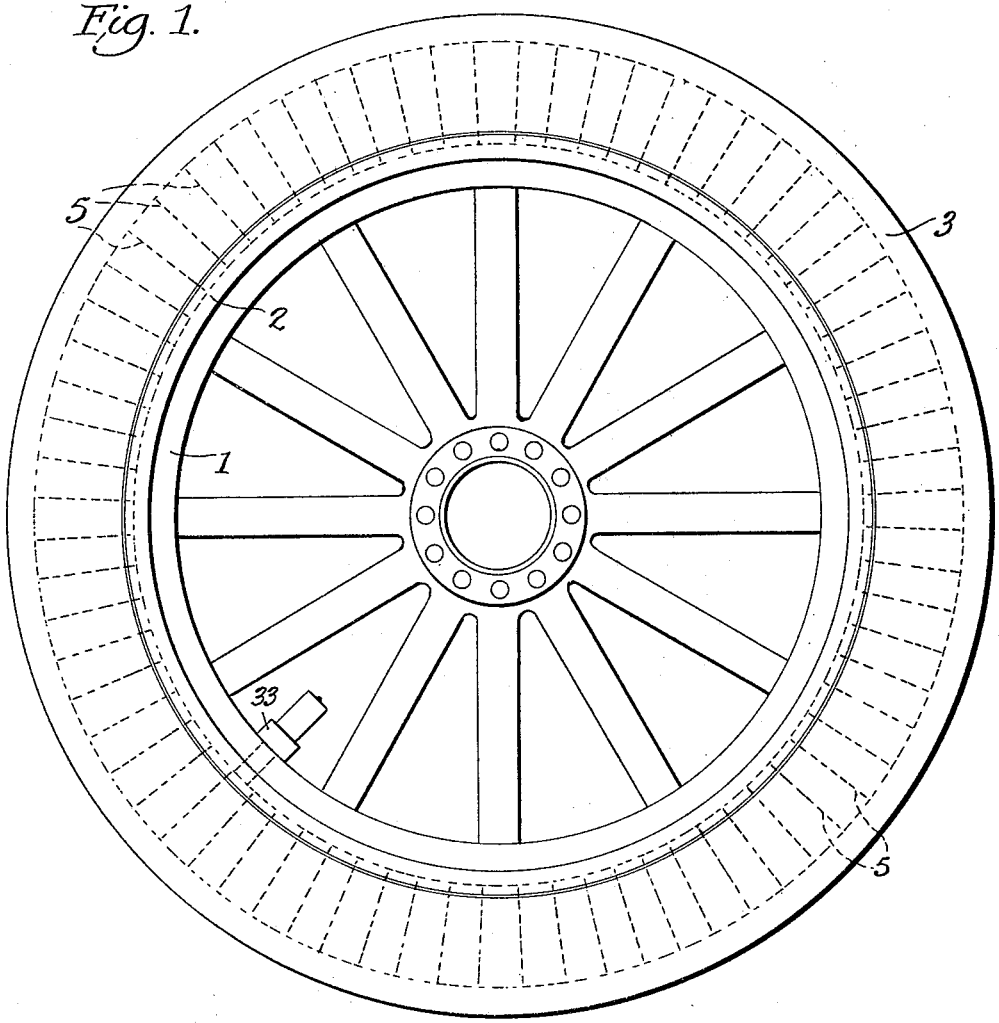

Referring now more particularly to the drawings, 1 designates the felly of a wheel, to which is secured a channeled rim 2 carrying the tire casing or shoe 3. This shoe or casing 3 may be of an ordinary type, split at the rim side and formed to provide the flanges 4 to seat within the rim.

The resilient inner core, liner or frame embodying my invention is adapted to fit within the shoe, and comprises an annular series of resilient units interlinked so that at any point of compression of the tread of the shoe a plurality of units will absorb the shock of compression. Each unit consists of a jointed spring metal band 5 shaped to fit the inside of the shoe and formed of a tread section 6, opposite side sections 7, and opposite base or rim sections 8, 8ª, united at their adjacent ends by pivot connections 9. The band sections 6 and 7 are preferably made of spring sheet steel of suitable gauge, while the sections 8, 8ª are castings, preferably of some suitable spring metal.

The sections 8, 8ª are curved on their rim sides to fit the inner surfaces of the flanges 4 and parts of the side walls of the shoe adjacent thereto, and said sections 8, 8ª include outer curved arms 10, 10ª and inner curved arms 11, 11ª. The arms 10, 10ª of the two sections 8, 8ª are respectively formed with knuckles 12, 12ª receiving a pivot pin 13, whereby said sections are pivotally coupled to permit them to move laterally and thus adapt the band to expand and contract in a lateral direction on compression of the shoe and its reaction and return to normal condition. The arms 11, 11ª bear against the inner faces of the flanges 4 and operate as spreading and clamping members acting to transmit thereto the spreading pressure of a spring 14 to hold the flanges 4 pressed against the sides of the rim and to thereby maintain the tire in position. The spring 14 engages studs 15 arranged on the inner faces of the sections 8, 8ª between the sets of arms 10, 10ª and 11, 11ª. By this means the flanges 4 will be held securely seated in the rim channel, while, whenever desired, by means of a suitable tool inserted between one of the flanges 4 and the adjacent side of the rim, the engaged flange 4 may be forced toward the other flange 4, thus contracting the rim side of the shoe, in which operation the spring 14 will be compressed, to allow the shoe to be unseated from the rim.

A bracket 16 is formed with a curved saddle 17 to seat upon the knuckles 12, 12ª, whereby said bracket is supported from the sections 8, 8ª, and this saddle is formed with an opening through which projects a holding stud 18 having an opening through which passes a cotter pin 19 or the like, whereby displacement of the bracket from the knuckle 12 is prevented. The bracket carries fixed holding studs 20, 20ª, which diverge outward radially toward coactive inwardly converging holding studs 21, 21ª pivoted for lateral swinging movements on brackets 22, 22ª fixed to the tread band section equidistantly on opposite sides of the center of the tire. Coiled springs 23, (one of which is shown) engage the respective sets of studs 20, 21, 20ª, 21ª, and are adapted to sustain the compression shocks on the tread of the shoe, to permit rim and cushioning movement of the tread when so subjected to compression, and to at all other times hold the shoe expanded.

Figure 4:
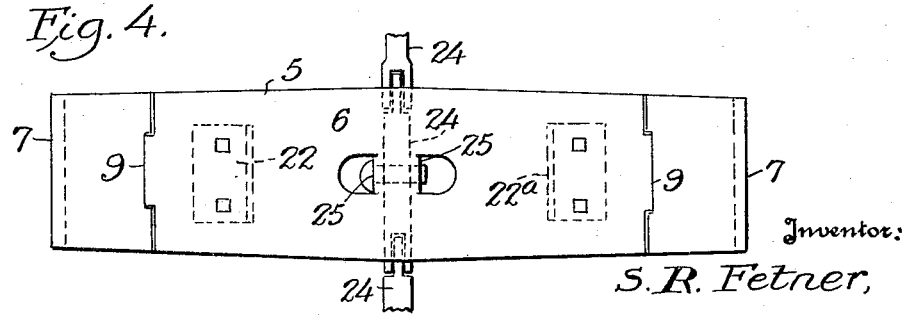
Figure 4 is a plan view of one of the jointed resilient band units.

The resilient band units are connected and held assembled at the tread point by link bars 24. Each link bar extends across the tread center of section 6 and is centrally pivoted to ears 25 formed on said section and has its oppositely projecting ends pivoted to the ends of the link bars of adjacent bands, as clearly shown in Figure 4. At the tread side the units are connected at opposite sides by elastic band cords 26 passing through retaining openings 27 in the sections 8, 8ª, and operating to hold the parts yieldingly united at this point. Slots 28 communicating with the openings 27 allow the bands to be slipped into and out of place under a predetermined contractive pressure.

A resilient core, liner or frame so constructed may be easily slipped inside a tire shoe and applied with the shoe to the rim, the sections 10, 10ª yielding inwardly under pressure to permit the flanges 4 of the shoe to enter the rim and then being pressed outwardly to hold the flanges firmly in the rim. The core so applied will resiliently back the shoe and expand and contract therewith and absorb all shocks and jars as effectually as an inflated inner tube, without the disadvantages of the latter.

Suitable devices, one or more, may be employed to hold the core or liner against creeping in the shoe. I have shown one of such devices comprising a stem 29 passing through the felly and rim and into the tire and carrying at its inner end two pivoted latch arms 30 arranged to lie against the inner faces of the clamping arms 11, 11ª. The latch arms have at their free ends slots 31 receiving the shanks of flanged or headed latch studs 32 on the arms 11, 11ª.

The heads of the studs are adapted to lap the inner faces of the arms 30, when the latter are drawn inward to allow the stud heads to project beyond the inner ends of the slots, thus latching the arms 30 to the arms 11, 11ª to hold the core from creeping, but the slots are of greater length than the stud heads, so that when it is desired to release the arms 11, 11ª from the arms 30, this may be done by moving the arms toward the shoe tread, as will be readily understood. The outer end of the stem projects radially inward of the rim, like a valve stem of a pneumatic tire, and is threaded to receive a nut 33 whereby the stem may be fastened to the rim and adjusted to hold the latches fast to the arms 11, 11ª, or whereby the stem may be released for withdrawal from the rim with the tire.

From the foregoing description, taken in connection with the drawings, the construction, operation and advantages of my improved resilient tire core will be readily understood and appreciated without a further and extended description. While the construction disclosed is preferred, it will, of course, be understood that changes in the form, proportion and details of construction of the parts may be made within the scope of the appended claims without departing from the spirit or sacrificing any of the advantages of the invention.

Having thus described my invention, I claim:

1. An automobile tire comprising an outer elastic tire casing, and a resilient core, inner lining or frame therein composed of an annular series of linked units, each composed of a resilient transverse band formed of jointed tread, rim and side sections yieldingly backing the shoe, and elastic cords connecting like members of all the rim sections of the bands at opposite sides of the tire.

2. An automobile tire comprising an outer elastic tire casing, and a resilient core, inner lining or frame therein composed of an annular series of linked units, each composed of a resilient transverse band formed of jointed tread, rim and side sections yieldingly backing the shoe, a saddle pivotally connecting the rim sections, and springs acting on the saddle and band sections.

3. An automobile tire comprising an outer elastic tire casing, and a resilient core, inner lining or frame therein composed of an annular series of linked units, each composed of a resilient transverse band formed of jointed tread, side and rim sections, a saddle pivotally connecting the rim sections, elastic connections between like members of all the rim sections at opposite sides of the tire, and pressure springs acting on the saddle and rim sections and holding said band in backing engagement with the shoe.

4. An automobile tire comprising an outer elastic tire casing, and a resilient core, inner lining or frame therein composed of an annular series of linked units, each composed of a resilient transverse band formed of jointed tread, side and coacting rim sections, elastic cords connecting like members of all the rim sections of the bands at opposite sides of the tire, a saddle pivotally connecting the rim sections, and pressure springs acting on the saddle and band sections and holding said band in backing engagement with the shoe.

5. An automobile tire comprising an outer elastic tire casing, and a resilient core, inner lining or frame therein composed of an annular series of linked units, each composed of a resilient transverse band formed of jointed tread, side and coacting rim sections, and pressure springs between the rim sections and between said sections and the tread section and holding the band sections in backing engagement with the shoe.

6. An automobile tire comprising an outer elastic tire casing, and a resilient core, inner lining or frame therein composed of an annular series of linked units, each composed of a resilient transverse band formed of jointed tread, side and coacting rim sections, the latter being pivotally connected for yielding movements and clamping engagement with the rim portions of the shoe, a pressure spring between the rim sections, and pressure springs between the rim sections and the tread section on opposite sides of the longitudinal center of the tire.

7. An automobile tire comprising an outer elastic tire casing, and a resilient core, inner lining or frame therein composed of an annular series of linked units, each composed of a resilient transverse band formed of jointed tread, side and coacting rim sections, a saddle pivotally connecting the rim sections, a pressure spring between the rim sections, and pressure springs between the saddle and the tread section on opposite sides of the longitudinal center of the tire.

8. An automobile tire comprising an outer elastic tire casing, and a resilient core, inner lining or frame therein composed of an annular series of linked units, each composed of a resilient transverse band formed of jointed tread, side and coacting rim sections, a saddle pivotally connecting the rim sections, a pressure spring between the rim sections, supports pivotally mounted on brackets on the tread section at opposite sides of the longitudinal center of the tire, and pressure springs between the saddle and the supports.

9. In a vehicle tire, the combination with a wheel felly, and a channeled rim applied thereto, of an elastic shoe having a split side formed with flanges engaging the rim, a resilient core, inner lining or frame within the shoe composed of annular series of linked units, each composed of a resilient transverse band, comprising jointed tread and side sections engaging the tread and sides of the shoe and rim sections jointed to each other and to the side sections and bearing on the rim portions and flanges of the shoe, a pressure spring between the rim sections of the band, pressure springs between the rim sections of the band and the tread section thereof on opposite sides of the longitudinal center of the tire, and fastening means passing through the felly and rim and engaging the rim sections of at least one of the bands.

10. In a vehicle tire, the combination with a wheel felly, and a channeled rim applied thereto, of an elastic shoe having a split side formed with flanges engaging the rim, a resilient core, inner lining or frame within the shoe composed of annular series of linked units, each composed of a resilient transverse band comprising jointed tread and side sections engaging the tread and sides of the shoe and rim sections jointed to each other and to the side sections and bearing on the rim portions and flanges of the shoe, a pressure spring between the rim sections of the band, pressure springs between the rim sections of the band and the tread section thereof on opposite sides of the longitudinal center of the tire, elastic cords connecting like members of all the rim sections of the bands at opposite sides of the tire, and fastening means passing through the felly and rim and engaging the rim sections of at least one of the bands.

11. An automobile tire comprising an outer elastic casing, and a resilient core, inner lining or frame therein composed of an annular series of linked units, each comprising a resilient transverse band formed of jointed tread, side and coacting rim sections, said rim sections having pivotally connected arms, a pressure spring between the rim sections, and pressure springs between the arms of the rim sections and the tread section on opposite sides of the longitudinal center of the tire.

12. An automobile tire comprising an outer elastic casing, and a resilient core, inner lining or frame therein composed of an annular series of linked units, each comprising a resilient transverse band formed of jointed tread, side and coacting rim sections, said rim sections having arms carried on the rim portions of the casing, arms jointed to the side sections, and arms pivotally connected to each other, a spring between the rim sections, and springs between the pivotally connected arms of the rim sections and the tread section on opposite sides of the longitudinal center of the tire.

13. An automobile tire comprising an outer elastic tire casing, and a resilient core, inner lining or frame therein consisting of an annular series of linked units, each composed of jointed tread, rim and side sections, link bars connecting the tread sections of the units to each other, and compression springs between the rim sections and between said sections and the tread section.

In testimony whereof I affix my signature.

STEPHEN R. FETNER.